(12) United States Patent
Weggenmann

(10) Patent No.: US 11,490,250 B1
(45) Date of Patent: Nov. 1, 2022

(54) PRIVACY FOR DIRECTIONAL DATA

(71) Applicant: SAP SE, Walldorf (DE)

(72) Inventor: Benjamin Weggenmann, Karlsruhe (DE)

(73) Assignee: SAP SE, Walldorf (DE)

( * ) Notice: Subject to any disclaimer, the term of this patent is extended or adjusted under 35 U.S.C. 154(b) by 50 days.

(21) Appl. No.: 17/313,331

(22) Filed: May 6, 2021

(51) Int. Cl.
*H04W 12/02* (2009.01)
*H04W 12/79* (2021.01)
*H04W 12/033* (2021.01)
*H04W 4/029* (2018.01)

(52) U.S. Cl.
CPC ........... *H04W 12/02* (2013.01); *H04W 4/029* (2018.02); *H04W 12/033* (2021.01); *H04W 12/79* (2021.01)

(58) Field of Classification Search
CPC ... H04W 12/02; H04W 12/79; H04W 12/033; H04W 4/029
USPC ........................................................ 455/411
See application file for complete search history.

(56) References Cited

FOREIGN PATENT DOCUMENTS

WO        2014204487        12/2014

OTHER PUBLICATIONS

Abramowitz, M, et al., Handbook of Mathematical Functions and Formulas, Graphs, and Mathematical Tables—Part 1, National Bureau of Standards, Applied Mathematics, Series 55, 10th printing edition, (1972), 1-105.

Abramowitz, M, et al., Handbook of Mathematical Functions and Formulas, Graphs, and Mathematical Tables—Part 2, National Bureau of Standards, Applied Mathematics, Series 55, 10th printing edition, (1972), 106-212.

Abramowitz, M, et al., Handbook of Mathematical Functions and Formulas, Graphs, and Mathematical Tables—Part 3, National Bureau of Standards, Applied Mathematics, Series 55, 10th printing edition, (1972), 213-315.

Abramowitz, M, et al., Handbook of Mathematical Functions and Formulas, Graphs, and Mathematical Tables—Part 4, National Bureau of Standards, Applied Mathematics, Series 55, 10th printing edition, (1972), 316-420.

Abramowitz, M, et al., Handbook of Mathematical Functions and Formulas, Graphs, and Mathematical Tables—Part 5, National Bureau of Standards, Applied Mathematics, Series 55, 10th printing edition, (1972), 421-525.

Abramowitz, M, et al., Handbook of Mathematical Functions and Formulas, Graphs, and Mathematical Tables—Part 6, National Bureau of Standards, Applied Mathematics, Series 55, 10th printing edition, (1972), 526-630.

Abramowitz, M, et al., Handbook of Mathematical Functions and Formulas, Graphs, and Mathematical Tables—Part 7, National Bureau of Standards, Applied Mathematics, Series 55, 10th printing edition, (1972), 631-735.

(Continued)

*Primary Examiner* — Joel Ajayi
(74) *Attorney, Agent, or Firm* — Schwegman Lundberg & Woessner, P.A.

(57) ABSTRACT

Directional data often conveys particularly sensitive information, such as user location. To protect user privacy, directional data is replaced with modified directional data that is selected based on the actual directional data, a privacy parameter, and a probability distribution on an n-sphere. In this way, the modified directional data value is useful when aggregated with other modified directional data values, but does not infringe the privacy of the directional data of the user.

20 Claims, 11 Drawing Sheets

(56) References Cited

OTHER PUBLICATIONS

Abramowitz, M, et al., Handbook of Mathematical Functions and Formulas, Graphs, and Mathematical Tables—Part 8, National Bureau of Standards, Applied Mathematics, Series 55, 10th printing edition, (1972), 736-838.

Abramowitz, M, et al., Handbook of Mathematical Functions and Formulas, Graphs, and Mathematical Tables—Part 9, National Bureau of Standards, Applied Mathematics, Series 55, 10th printing edition, (1972), 839-940.

Abramowitz, M, Handbook of Mathematical Functions and Formulas, Graphs, and Mathematical Tables—Part 10, National Bureau of Standards, Applied Mathematics, Series 55, 10th printing edition, (1972), 941-1060.

Andrés, M, et al., "Geo-indistinguishability: Differential privacy for location-based systems", ACM SIGSAC Conference on Computer & Communications Security, (2013), 901-914.

Bloom, Burton, "Space/time Trade-offs in Hash Coding with Allowable Errors", Communication of the ACM, vol. 13, No. 7, (1970), 422-426.

Chatzikokolakis, K, et al., "Broadening the Scope of Differential Privacy Using Metrics", 13th Privacy Enhancing Technologies Symposium, pp. 82-102, (2013), 32 pgs.

Cho, Eunjoon, et al., "Friendship and Mobility: User Movement In Location-Based Social Networks", Proceedings of the 17th ACM SIGKDD international conference on Knowledge discovery and data mining, (2011), 9 pgs.

Duchi, John, et al., "Local Privacy and Statistical Minimax Rates", IEEE 54th Annual Symposium on Foundations of Computer Science, (2013), 429-438.

Dwork, C, et al., "Calibrating noise to sensitivity in private data analysis", in Proceedings of the Third Conference on Theory of Cryptography, ser. TCC'06. Berlin, Heidelberg: Springer-Verlag, <http://dx.doi.org/10.1007/1168187814>, (2006), 265-284.

Dwork, Cynthia, et al., "The Algorithmic Foundations of Differential Privacy", Foundations and Trends in Theoretical Computer Science, 9(3-4), 211-407., (2014), 281 pgs.

Erlingsson, U, et al., "RAPPOR: Randomized Aggregatable Privacy-Preserving Ordinal Response", Proceedings of the ACM SIGSAC conference on computer and communications security, (2014), 1054-1067.

Fisher, Ronald, "Dispersion on a Sphere", Proceedings of the Royal Society A: Mathematical, Physical and Engineering Sciences, 217(1130), (1953), 295-305.

Hern, Alex, "Fitness tracking app strava gives away location of secret US army bases", The Guardian, [Online], Retrieved from the internet: <URL: https://www.theguardian.com/world/2018/jan/28/fitness-tracking-app-gives-away-location-of-secret-us-army-bases.>, (2018), 4 pgs.

Humbert, P, "The Confluent Hypergeometric Functions of Two Variables", Proceedings of the Royal Society of Edinburgh 4, (1922), 12 pgs.

Jammalamadaka, S R, et al., "A new family of circular models: The wrapped laplace distributions", Advances and applications in statistics 3(1), (2003), 19 pgs.

Kim, Jong, et al., "Application of Local Differential Privacy to Collection of Indoor Positioning Data", IEEE Access, vol. 6, (2018), 4276-4286.

Krumm, John, "A Survey of Computational Location Privacy", Personal and Ubiquitous Computing, (2008), 9 pgs.

Kurz, Gerhard, et al., "Stochastic Sampling of the Hyperspherical von Mises-Fisher Distribution Without Rejection Methods", Conference: Proceedings of the IEEE ISIF Workshop on Sensor Data Fusion: Trends, Solutions, Applications, (2015), 6 pgs.

Lam, S K, et al., "Numba: A LLVM-based Python JIT Compiler", Proceedings of the Second Workshop on the LLVM Compiler Infrastructure in HPC, LLVM, (2015), 6 pgs.

McSherry, Frank, et al., "Mechanism Design via Differential Privacy", 48th Annual IEEE Symposium on Foundations of Computer Science, (2007), 94-103.

Oliphant, Travis, , Guide to NumPy, Trelgol Publishing USA, (Dec. 6, 2006), 378 pgs.

Pyrgelis, Apostolos, "Knock Knock, Who's There? Membership Inference on Aggregate Location Data", arXiv:1708.06145v2, 25th Annual Network and Distributed System Security Symposium, NDSS, (2017), 15 pgs.

Saw, J G, "A family of distributions on the m-sphere and some hypothesis tests", Biometrika, 65(1), (1978), 69-73.

Ulrich, G, "Computer generation of distributions on the m-sphere", Applied Statistics, 33(2), (1984), 158-163.

Van Der Walt, Stefan, et al., "The numpy array: a structure for efficient numerical computation", Computing in Science & Engineering, 13(2). https://arxiv.org/abs/1102.1523v1, (2011), 8 pgs.

Virtanen, Pauli, et al., "SciPy 1.0: fundamental algorithms for scientific computing in Python", Nature Methods, (2020), 12 pgs.

Wang, Y, et al., "Differential privacy preserving spectral graph analysis", Pacific-Asia Conference on Knowledge Discovery and Data Mining, (2013), 12 pgs.

Warner, S, "Randomized response: A survey technique for eliminating evasive answer bias", Journal of the American Statistical Association, 60(309), (1965), 63-69.

Wood, A T, "Simulation of the Von Mises Fisher Distribution", Communications in Statistics—Simulation and Computation, 23(1), (1994), 157-164.

"European Application Serial No. 21211945.7, Extended European Search Report dated May 6, 2022", 8 pgs.

| 510 → | LOCATION TABLE | | | |
|---|---|---|---|---|
| 520 → | USER ID | DATE | LATITUDE | LONGITUDE |
| 530A → | 1 | 1/1/2021 1:23 | 51.1789 N | 1.8262 W |
| 530B → | 1 | 1/2/2021 2:34 | 27.1127 S | 109.3497 W |
| 530C → | 2 | 1/1/2021 1:01 | 25.0000 | 71.0000 |

| 540 → | SLEEP SCHEDULE TABLE | | |
|---|---|---|---|
| 550 → | USER ID | SLEEP TIME | WAKE TIME |
| 560A → | 1 | 20:30 | 6:30 |
| 560B → | 2 | 21:00 | 7:15 |
| 560C → | 3 | 4:00 | 11:00 |

| 570 → | PRIVACY TABLE | |
|---|---|---|
| 580 → | DATA TYPE | EPSILON |
| 590A → | LOCATION | 0.5 |
| 590B → | TIME | 0.2 |
| 590C → | DAY OF WEEK | 0.1 |

*FIG. 5*

PRIVACY FOR DIRECTIONAL DATA

TECHNICAL FIELD

The subject matter disclosed herein generally relates to directional data. Specifically, the present disclosure addresses systems and methods to provide privacy for directional data.

BACKGROUND

Directional data is a class of data where values are on a closed curve. For example, geographic locations lie on the surface of an approximate sphere rather than on a two-dimensional Cartesian plane. As another example, the time of day or day of week can be interpreted as points on a circle.

BRIEF DESCRIPTION OF THE DRAWINGS

FIG. 5 is a block diagram of an example database schema suitable for storing directional data and privacy measures for use in providing privacy for directional data.

DETAILED DESCRIPTION

Figure 1:
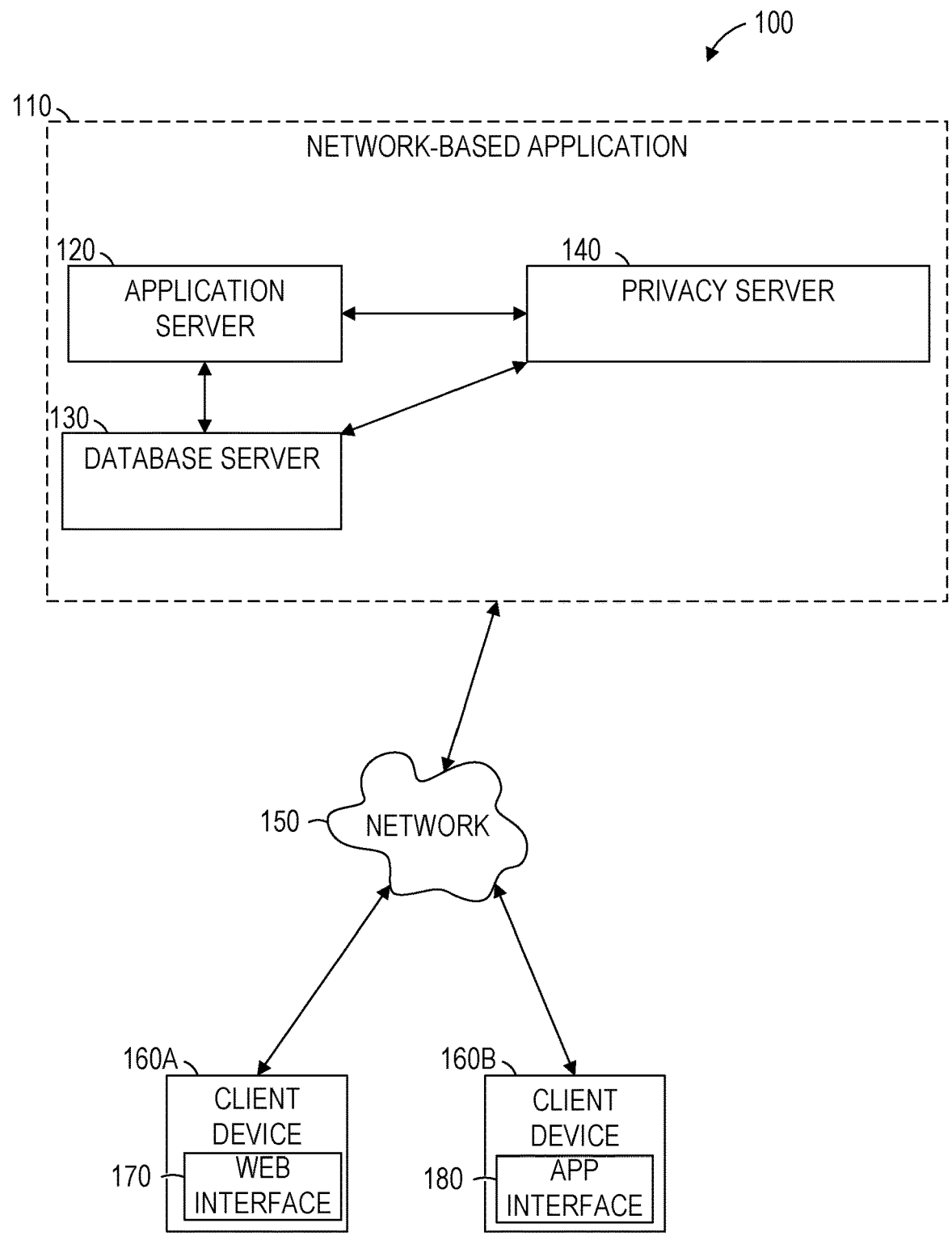
FIG. 1 is a network diagram illustrating an example network environment suitable for providing privacy for directional data.

Example methods and systems are directed to protecting privacy for directional data. The privacy of the directional data may be protected on the device providing the directional data or on a server that aggregates directional data.

While large-scale data collection and processing has become a valuable technique that drives businesses and innovation, the data collected in such scenarios is often privacy sensitive, and users may be reluctant to share their whereabouts during the course of the day. Directional data often conveys particularly sensitive information, such as user location.

Non-directional data can be anonymized by introducing random perturbations into the observed data values. Non-directional techniques can be applied to directional data by treating the directional data as though it were non-directional. For example, a twenty-four-hour day may be treated as a non-directional range of 0:00 to 23:59, ignoring the adjacency between the two edge values.

Directional data may be considered to as points on an n-sphere or as vectors from the origin of an n-sphere to a point on the surface of the n-sphere. An n-sphere is a set of points in an (n+1)-dimensional Euclidian space that are located at a constant distance r (the radius of the n-sphere) from a central point (the center of the n-sphere). The n-sphere with a radius of 1 is termed "the unit n-sphere" or just "the n-sphere." Accordingly, an ordinary 3-dimensional unit sphere may be referred to as "the 2-sphere." Similarly, a 2-dimensional circle may be referred to as "a 1-sphere." Mathematically, for $n \in N$, the unit $(n-1)$-sphere $S^{n-1} := \{x \in R^n : \|x\| = 1\}$ is the set of unit vectors in n-dimensional Euclidean space. The $(n-1)$-sphere of radius $r>0$ is denoted as $rS^{n-1}$.

To protect the privacy of individuals while maintaining data-driven business models, differential privacy may be used. The goal of differential privacy is to quantify the risk of an individual that results from participation in data collection. In the central model, data is stored in a central database. Adjacent databases are databases that differ by at most one record. Then, a differentially private query on the two adjacent databases yields results with similar probabilities, i.e., answers that are probabilistically indistinguishable. This may be achieved via random mechanisms that return noisy query results, thus masking the impact of each individual. The amount of noise is determined by a predetermined parameter that defines the level of privacy for each record.

Differential privacy mechanisms have been proposed previously for various settings and data types, but none of these approaches intrinsically consider the potentially directional nature of the underlying data. For example, the standard Laplace mechanism is defined on the (infinite) real line, and the Planar Laplace mechanism is defined only for planar (i.e., non-spherical) locations. Post-processing, such as clipping or wrapping, can be applied to adapt these mechanisms to a periodic domain (e.g., by treating 12:01 AM and 11:59 PM as being at opposite ends of a linear 24-hour range instead of nearly adjacent points in a periodic domain). However, the amount of noise introduced using these mechanisms may be increased due to the effects of the post-processing, reducing the value of the data.

Using the systems and methods described herein, directional privacy is provided that operates intrinsically on directional data. By using these methods on directional data rather than treating the directional data as non-directional data, privacy is protected to the same degree with reduced introduction of noise, increasing the accuracy of systems that rely on the gathered data without compromising user privacy.

Additionally or alternatively, directional data privacy may be obtained by avoiding the provision of precise directional data from a client device. Instead of providing an actual directional data value, a modified directional data value may be provided. The modified directional data value may be selected by the client device based on the actual directional data, a privacy parameter, and a probability distribution on an n-sphere. In this way, the modified directional data value is useful to the server when aggregated with other modified directional data values, but does not infringe the privacy of the directional data of the user.

Accordingly, one or more of the methodologies described herein may improve computing systems by allowing for more accurate measurement of aggregate user behavior without increasing the impingement on user privacy. Alternatively, the same degree of accuracy may be achieved with fewer records received from users. Computing resources used by one or more machines, databases, or networks may similarly be reduced. Examples of such computing resources include processor cycles, network traffic, memory usage, data storage capacity, power consumption, and cooling capacity.

For a given set Z, Pz denotes the set of probability distributions (or measures) on Z, i.e., the set of normed and σ-additive functions $P:\sigma(Z) \rightarrow [0, 1]$ where $\sigma(Z)$ is a σ-algebra on Z. The probability of an event $Z \in \sigma(Z)$ (i.e., a measurable subset of Z) is thus given by P[Z]. A distribution P is typically specified by its probability density function (PDF), is denoted by P[z]. For univariate distributions on $Z \subseteq R$, we also denote the cumulative distribution function (CDF) at Z by $P[z \leq Z]$, shorthand for $P[\{z \in R : z \leq Z\}]$. Families of distributions parametrized by one or more parameters, such as µ or ϵ, are denoted by appending the parameters in parentheses as in $P(\mu,\epsilon)[\cdot]$, or simply $P(\mu,\epsilon)$.

Definition 1. Let X and Z be two sets. A random mechanism from X to Z is a function $M: X \rightarrow Pz$ that assigns to each input x a probability distribution on Z. In particular, M can be specified through a parametrized family of distributions m(x) on Z via M(x)=M(2) for $x \in X$; we then say M is the mechanism induced by M.

From an algorithmic perspective, a random mechanism M is run on a given input x by sampling a realization z from the distribution M(x). This is written as $z \leftsquigarrow M(x)$.

Differential privacy may also be referred to as ϵ-indistinguishability. Its goal is to give semantic privacy by quantifying the risk of an individual that results from participation in data collection. In a central model, the collected data may be stored in a central database with one record per participant. Adjacent databases are databases that differ by at most one record (i.e., one individual's data). To provide differential privacy, a differentially private query on both databases should yield matching results with similar probabilities, i.e., answers that are probabilistically indistinguishable. This is achieved via random mechanisms on the universe of datasets D that return noisy query results, thus masking the impact of each individual.

Definition 2. Let $\epsilon > 0$ be a privacy parameter. A random mechanism $M: D \rightarrow Pz$ fulfills ϵ-differential privacy if for all adjacent databases x, $x^0 \in D$, and all sets of possible outputs $Z \subset supp\, M$, $$M(x)[Z] \leq e^\epsilon \cdot M(2^0)[Z].$$

In the local model, noise is added locally at the data source, before the data is collected and stored in a central database. A basic example is randomized response, where each survey participant either provides a truthful or a random answer depending on the flip of an (unbiased) coin.

A limitation with differential privacy is that the indistinguishability is achieved between two records on a per-record level regardless of their actual values. This can be especially problematic in the local model, where each user might just submit one single record, in which case a differentially private mechanism with small privacy parameter E would enforce all submitted records to be indistinguishable, thus rendering the collected data essentially useless.

Definition 3. Let $\epsilon > 0$ be a privacy parameter. On a metric space (X,d), a mechanism M satisfies ϵd-privacy (also referred to as metric privacy) if for all x, $x' \in X$ and all $Z \in supp\, M$, $$M(x)[Z] \leq \exp(\epsilon \cdot d(x,x')) \cdot M(x')[Z].$$

Thus, the level of indistinguishability of any two points x, $x^0$ amounts to $\epsilon d(x, x')$, i.e., it depends on ϵ and their distance. If we consider an arbitrary but fixed distance r>0, any two points with $d(x, x') \leq r$ achieve a level of indistinguishability at most l:=ϵr, thus, an ϵd-private mechanism M achieves a privacy level l=ϵr within a protection radius r.

Note that we recover the original notion of ϵ-differential privacy on the space of databases X=D if we use the record-level edit distance $d_{\pm 1}$, as datasets x, $x' \in D$ differ by at most one record if and only if $d_{\pm 1}(x, x^0) \leq 1$.

Definition 4. In a metric space (X,d), two inputs x, $x' \in X$ are adjacent (with respect to d) if $d(x, x') \leq 1$. This is written as $x \sim_d x'$ (or $x \sim x'$ if d is understood from the context).

Directional statistics is an area of statistics that is concerned with directions. Since directions are independent of magnitude, they can be identified by unit vectors, i.e., points on a unit sphere.

Definition 5. For $n \in N$, the unit (n−1)-sphere $S^{n-1} := \{x \in R^n : \|X\| = 1\}$ is the set of unit vectors in n-dimensional Euclidean space. The (n−1)-sphere of radius r>0 is denoted as $rS^{n-1}$. Thus, the unit sphere $S^0$ comprises two points at +1 and −1 on the one-dimensional real number line, the unit sphere $S^1$ is a unit circle on a two-dimensional plane, and the unit sphere $S^2$ is an ordinary unit sphere in a three-dimensional space.

Fact 6. The surface area of the unit sphere $S^{n-1}$ is $$\frac{2\pi^{\frac{n}{2}}}{\Gamma(\frac{n}{2})}$$

For a sphere of radius r, the equation above is multiplied by $r^{n-1}$ to find the surface area of the sphere.

Example 7. The uniform distribution $Uni(S^{n-1})$ on $S^{n-1}$ has a constant PDF $$Uni(S^{n-1})[x] \stackrel{def}{=} S_{n-1}^{-1} = \frac{1}{2}\Gamma\left(\frac{n}{2}\right)\pi^{-\frac{n}{2}}.$$

Distributions on $S^{n-1}$ that are unimodal and rotationally symmetric about the mode $\mu \in S^{n-1}$ are referred to as rotationally symmetric distributions. The densities P[x] of such rotationally symmetric distributions depend on x only through the projection $t = \mu^T x \in [-1,1]$ of x on the modal axis from the origin 0 through µ. Therefore, all points x with $\mu^T x = t$ share the same density value $P[x] = \bar{P}[\mu^T x] = \bar{P}[t]$ for a corresponding kernel function $\bar{P}: [-1,1] \rightarrow R_{\geq 0}$.

Given a point $\mu \in S^{n-1}$, any point $x \in S^{n-1}$ can be decomposed into two orthogonal components, one along the axis (from the origin) through µ and another along a unit vector $\xi \perp \mu$, as $$x = t\mu + \sqrt{1-t^2}\xi, \text{ where } t = \mu^T x. \quad \text{Equation 1:}$$

The term $t = \mu^T x$ is called the mixture variable. The density of the mixture variable is called the mixture density and is defined as $$PMix[t] = \int_{x:\mu^T x=t} P[x]dx, \, t \in [-1,1].$$

Lemma 8. Given a rotationally symmetric distribution P with kernel function $\bar{P}[t]$, its mixture density PMix[t] may be expressed in terms of the kernel function as $$PMix[t] = S_{n-2} \cdot (1-t^2)^{\frac{n-3}{2}} \cdot \bar{P}[t], \, t \in [-1, 1]. \quad \text{Equation 2}$$

Instead of the mixture density of $t = \mu^T x$, we can also consider the angular density of the angle or arc length $\theta = \arccos(\mu^T x)$ between a random point x and the mode µ.

Corollary 9. Given a rotationally symmetric distribution P with kernel function $\overline{P}[t]$, the angular density of P for an angle $\theta \in [0, \pi]$ is $$PArc[\theta] = S_{n-2} \sin^{n-2}(\theta) \cdot \overline{P}[\cos(\theta)]. \quad \text{Equation 3:}$$

The (n−1)-dimensional VMF distribution, named after von Mises and Fisher, is a probability distribution on the unit hypersphere $S^{n-1}$.

Definition 10. The VMF distribution on $S^{n-1}$ with mean direction $\mu \in S^{n-1}$ and concentration parameter $\kappa \geq 0$ is given by the density $$VMF(\mu,\kappa)[x] = C_{VMF}(n,\epsilon) \cdot \exp \kappa \cdot \mu^T x. \quad \text{Equation 4:}$$

Setting $$v := \frac{n}{2} - 1,$$

the normalization factor amounts to $$C_{VMF(n,\kappa)}[x] = \frac{\kappa^v}{(2\pi)^{v+1} I_v(\kappa)} = \frac{\Gamma(v+1)e^\kappa}{2 \cdot \pi^{v+1} M\left(v + \frac{1}{2}, 2v + 1, 2\kappa\right)}$$

The parameter $\kappa$ characterizes how strongly the random vectors $x \sim VMF(\mu,\kappa)$ are concentrated about the mean direction $\mu$. If $\kappa > 0$, the distribution is unimodal and the mode matches $\mu$. A VMF distribution with zero concentration ($\kappa = 0$) degenerates to the uniform distribution $Uni(S^{n-1})$.

Definition 11. The surface distance between two points x, $y \in r\ S^{n-1}$ is given by the arc length $$d_1(x,y) := r \arccos(x^T y).$$

On the unit sphere (r=1), the surface distance $d_{\sphericalangle}$ between two points equates to the enclosed angle (in radians) between them—together, $S^{n-1}$ with $d_{\sphericalangle}$ becomes a metric space for angles.

Definition 12. Let $\epsilon > 0$ be a privacy parameter. A mechanism M on $S^{n-1}$ fulfills $\epsilon d_{\sphericalangle}$—privacy if for all x, x'$\in S^{n-1}$ and all $Z \subset \operatorname{supp} M$, $$M(x)[Z] \leq \exp(\epsilon \cdot d_{\sphericalangle}(x,x')) \cdot M(x')[Z].$$

Fact 13. Let $f: D \to S^{n-1}$ be a query function, and let $M_\epsilon$ be an $\epsilon$d-private mechanism on $S^{n-1}$ with metric d. Then its d-sensitivity is $$\Delta = \Delta_d f := \max_{x \sim D y} d_{\sphericalangle}(f(x), f(y))$$

and the composition $M_{\epsilon/\Delta} \circ f$ is $\epsilon$-differentially private.

Theorem 14. Let $\epsilon > 0$ be a privacy parameter. The VMF mechanism on $S^{n-1}$ induced by $x \mapsto VMF(x, \epsilon)$ for $x \in S^{n-1}$ fulfills $\epsilon d_2$-privacy.

Corollary 15. As $d_2(x,y) \leq d_{\sphericalangle}(x,y)$ for any x, y $\in S^{n-1}$, the VMF mechanism also fulfills $\epsilon d_{\sphericalangle}$-privacy. By Fact 13, the VMF mechanism $VMF(x, \epsilon/\Delta)$ also provides $\epsilon$-differential privacy for sphere-valued functions $f: D \to S^{n-1}$ on the space of databases D, where $\Delta$ is the sensitivity of $f$.

According to Equations 2 and 3, the mixture and angular densities of a VMF distribution are $$VMFMix[t] = C'_{VMF} \cdot (1 - t^2)^{\frac{n-3}{2}} e^{\kappa t} \quad \text{Equation 5}$$

$$VMFArc[\theta] = C'_{VMF} \cdot \sin^{n-2}(\theta) e^{\kappa \cos(\theta)}, \quad \text{Equation 6}$$

where the normalization factor amounts to $$C'_{VMF} = C_{VMF} \cdot S_{n-2} \quad \text{Equation 7}$$

$$= \left(\frac{\kappa}{2}\right)^v \left(\Gamma\left(\frac{1}{2}\right)\Gamma\left(\frac{n-1}{2}\right) I_v(\kappa)\right)^{-1}$$

$$= \frac{e^\kappa}{B\left(\frac{1}{2}, \frac{n-1}{2}\right) M\left(\frac{n-1}{2}; n-1; 2\kappa\right)}$$

To assess the error induced by a random mechanism, we can use statistical tools such as the expected value of an error measure based on the underlying distribution. Concretely, for a random vector $x \sim VMF(\mu, \kappa)$, we can provide an analytical expression for the expected Euclidean distance to the mode $\mu$.

Theorem 16. The expected Euclidean distance between a random vector $x \sim VMF(\mu, \kappa)$ and the mode $\mu$ can be expressed as expected value over the mixture density. It evaluates to $$E_{x \sim VMF}[d_2(x, \mu)] = E_{t \sim VMFMix}[\sqrt{2}\sqrt{1-t}] \quad \text{Equation 8}$$

$$= \frac{B\left(\frac{1}{2}, \frac{n}{2}\right)}{B\left(\frac{1}{2}, n - \frac{1}{2}\right)} \cdot \frac{M\left(\frac{n-1}{2}; n - \frac{1}{2}; 2\kappa\right)}{M\left(\frac{n-1}{2}; n-1; 2\kappa\right)}$$

Theorem 17. Setting $$\alpha := \frac{n-1}{2}$$

and $$x := \frac{T+1}{2},$$

the CDF of the VMF mixture distribution VMFMix(n, $\kappa$) at $T \in [-1,1]$ can be written as $$VMFMix(n, \kappa)[t \leq T] = \frac{x^\alpha}{\alpha} \cdot \frac{\Phi_1(\alpha, 1-\alpha, 1+\alpha; x, 2\kappa x)}{B(\alpha, \alpha) M(\alpha, 2\alpha, 2\kappa)}. \quad \text{Equation 9}$$

To generate a point $x \sim VMF(\mu, \kappa)$, we can construct a random vector $x = t\mu + \xi\sqrt{1-t^2}$ through the tangent-normal decomposition of Equation 1 by sampling a value t from the mixture distribution VMFMix(n, $\kappa$) and uniformly drawing an orthogonal unit vector $\xi \in S^{n-2} \perp \mu$.

To perform the directional VMF privacy mechanism on a given input vector $x \in S^{n-1}$, samples $z \sim VMF(x, \kappa)$ are generated. The mode is given by the input x and the concentration parameter $\kappa$ is defined through the privacy parameter $\epsilon$. Given a unit vector $x \in S^{n-1}$, in order to achieve directional privacy with privacy parameter $\epsilon$, i.e. $\epsilon d_{\sphericalangle}$-privacy (Definition 12), $\kappa$ may be set equal to $\epsilon$ and a sample $z \sim VMF(x, \epsilon)$ is drawn (Corollary 15).

The privacy guarantees of metric privacy (Definition 3) and its variants can alternatively be regarded as providing a privacy (or indistinguishability) level $l = \epsilon r$ to any two points, x, x' within a protection radius $r > 0$. For directional privacy, this is achieved by sampling from the directional distribution with concentration parameter $\kappa=1/r$ instead of $\epsilon$. Thus, an $(1/r)$-private mechanism achieves a privacy level 1 within a protection radius r.

Note that as special case, when $x=f(D)$ is the result of a (query) function $f:D\to S^{n-1}$, pure $\epsilon$-differential privacy may be achieved by setting the protection radius $r:=\Delta$ to the (worst-case) sensitivity of $f$, i.e., by sampling with a concentration parameter $\kappa=\epsilon/\Delta$ as discussed in Fact 13. Thus, directional privacy allows relaxing pure differential privacy by specifying a protection radius r smaller than the sensitivity $\Delta$.

FIG. 1 is a network diagram illustrating an example network environment 100 suitable for providing privacy for directional data. The network environment 100 includes a network-based application 110, client devices 160A and 160B, and a network 150. The network-based application 110 is provided by application server 120 in communication with a database server 130 and a privacy server 140. The application server 120 accesses application data (e.g., application data stored by the database server 130) to provide one or more applications to the client devices 160A and 160B via a web interface 170 or an application interface 180.

The application server 120, the database server 130, the privacy server 140, and the client devices 160A and 160B may each be implemented in a computer system, in whole or in part, as described below with respect to FIG. 11. The client devices 160A and 160B may be referred to collectively as client devices 160 or generically as a client device 160.

The client devices 160 provide directional data to the application server 120 for storage in a database of the database server 130. For example, location data (e.g., derived from the global positioning service (GPS) of a cell phone) may be uploaded to the application server 120 via the network 150 and stored by the database server 130. The location data may be aggregated to provide various services such as traffic flow measurements, population density measurements, peak time measurements for businesses, or any suitable combination thereof.

The privacy server 140 accesses directional data from the database server 130. The privacy server 140 aggregates the directional data (e.g., to determine a mean, a median, a standard deviation, a variance, or any suitable combination thereof) and modifies the aggregated value to provide differential privacy for the users that provided the directional data. The functionality of the privacy server 140 may be integrated into the database server 130.

Alternatively, the client devices 160 may provide privacy for the user's directional data by modifying the data before it is uploaded to the application server 120. In either case, the modification may be performed based on a privacy parameter and a probability distribution on an n-sphere, where n is the dimensionality of the directional data minus 1 (e.g., one for two-dimensional data such as day of week and time of day located on a circle, two for three-dimensional data such as location on the (approximately) spherical Earth, or five for six-dimensional data such as combined location and orientation on a sphere).

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 11. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 120, the database server 130, the privacy server 140, and the client devices 160A-160B are connected by the network 150. The network 150 may be any network that enables communication between or among machines, databases, and devices. Accordingly, the network 150 may be a wired network, a wireless network (e.g., a mobile or cellular network), or any suitable combination thereof. The network 150 may include one or more portions that constitute a private network, a public network (e.g., the Internet), or any suitable combination thereof.

Figure 2:
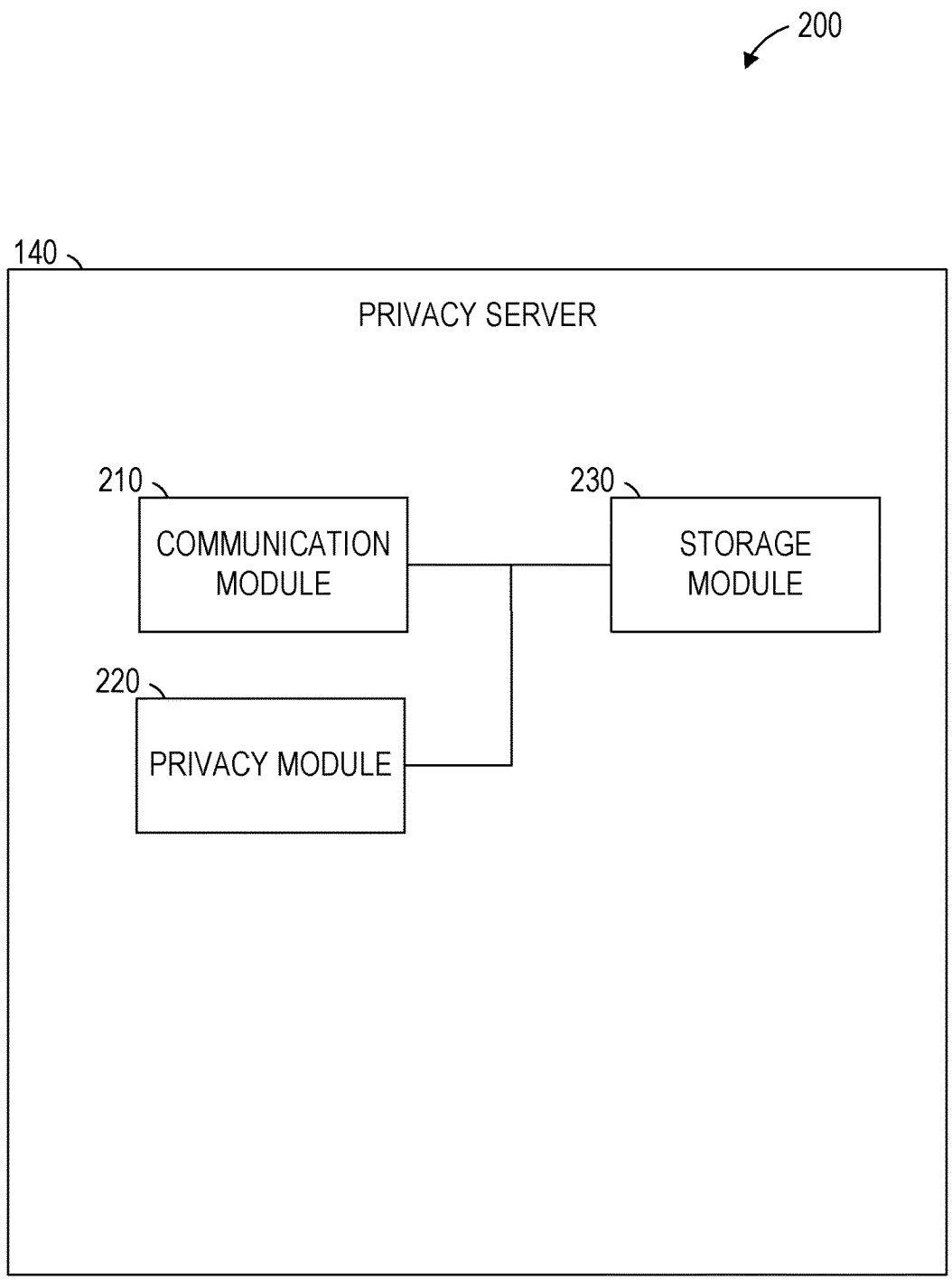
FIG. 2 is a block diagram of an example privacy server suitable for providing privacy for directional data.

FIG. 2 is a block diagram 200 of the privacy server 140, suitable for protecting privacy of directional data. The privacy server 140 is shown as including a communication module 210, a privacy module 220, and a storage module 230, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, modules described herein as being implemented within a single machine, database, or device may be distributed across multiple machines, databases, or devices.

The communication module 210 receives data sent to the privacy server 140 and transmits data from the privacy server 140. For example, the communication module 210 may receive, from the client device 160A or 160B, directional data to be stored by the database server 130. The privacy server 140 may modify the received directional data before sending the modified data, via the communication module 210, to the database server 130, protecting the privacy of the user of the client device 160A or 160B. As another example, the communication module 210 may receive a request for aggregated directional data, request the directional data from the database server 130 and provide the directional data to the privacy module 220 for processing in a manner that protects the privacy of the users that contributed the directional data. Communications sent and received by the communication module 210 may be intermediated by the network 150.

The privacy module 220 accesses directional data from the database server 130 and, based on the accessed directional data, generates aggregated results. The aggregated results may be modified based on a predetermined privacy factor and a probability distribution on an n-sphere before being provided in response to a request for the aggregated results. Thus, the results provided are similar to the actual results, but the recipient cannot be sure exactly how they differ, protecting the privacy of the users that contributed the underlying directional data.

The storage module 230 stores the predetermined privacy factor and other data used by the privacy module 220 to modify directional data to protect privacy. The storage module 230 may store programming instructions for the communication module 210, the privacy module 220, or both.

The privacy module 220 is described as being part of the privacy server 140, operating on data accessed from the database 130. Alternatively, the privacy module 220 may be part of the client devices 160A-160B, operating on data generated by the client device before providing the privacy-protected directional data to the database 130.

Figure 3:
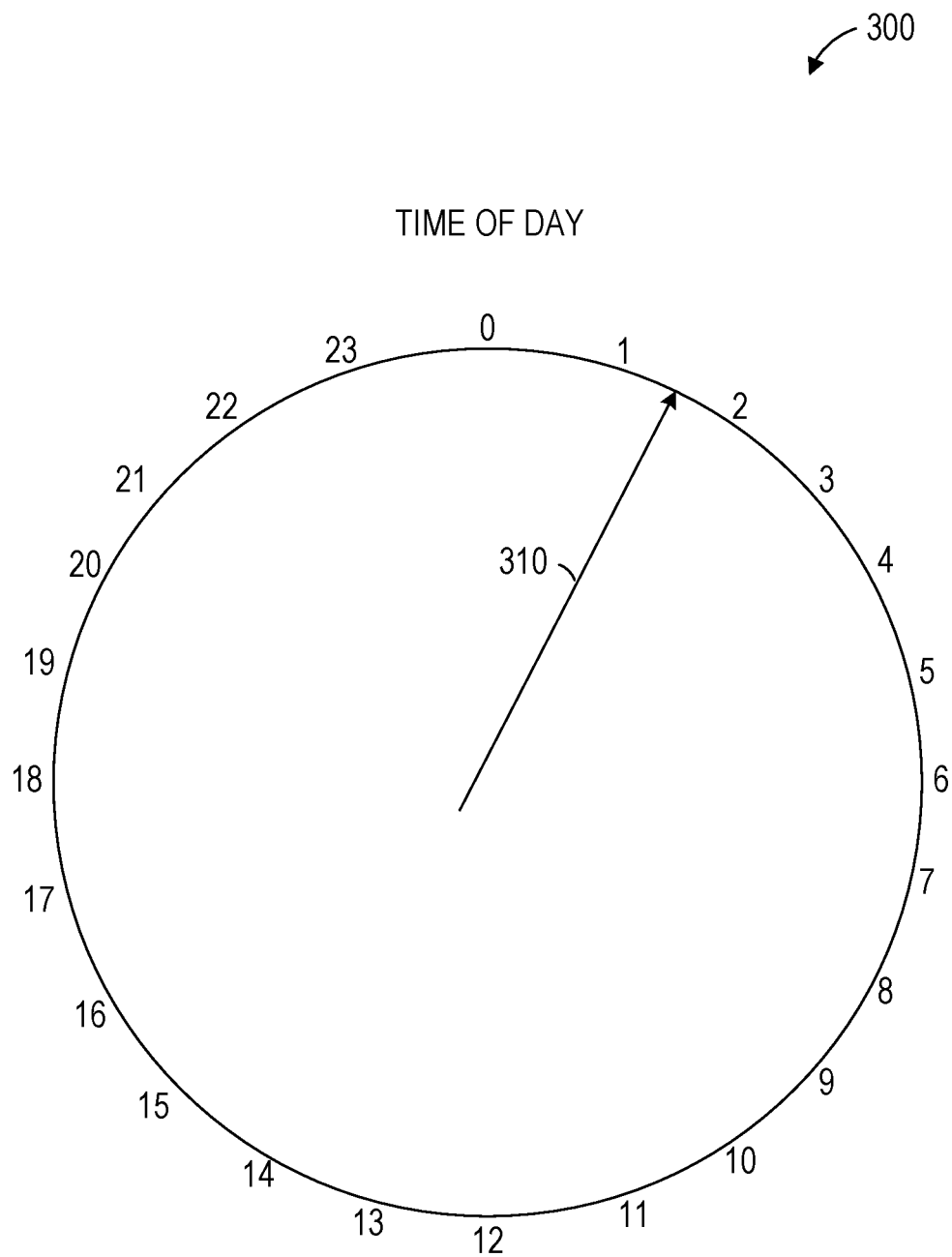
FIG. 3 is a conceptual diagram showing a time of the day as directional data on a 1-sphere.

FIG. 3 is a conceptual diagram showing a time of the day as directional data on a 1-sphere (a circle) 300. The time of day is shown as a 24-hour clock, continuously connecting all times of the day. The vector 310 shows the time 1:30. To simplify calculations, the circle 300 may be a unit circle (a circle with a radius of one) and the vector 310 may be a unit vector (a vector with a length of one). The arc distance between two vectors may be measured as the smaller angle between them, regardless of where on the circle 300 the two vectors are located. Thus, the arc distance between 23:00 and 1:00 is π/6 radians (30 degrees) even though the 0:00 value lies between them. Since the circle is a unit circle, the distance on the surface of the circle 300 between the ends of the vectors is equal to the arc distance in radians. If the directional data were treated as linear data with a range of 0 to 23:59, the distance between 1:00 and 23:00 would be measured as 22 hours apart.

Figure 4:
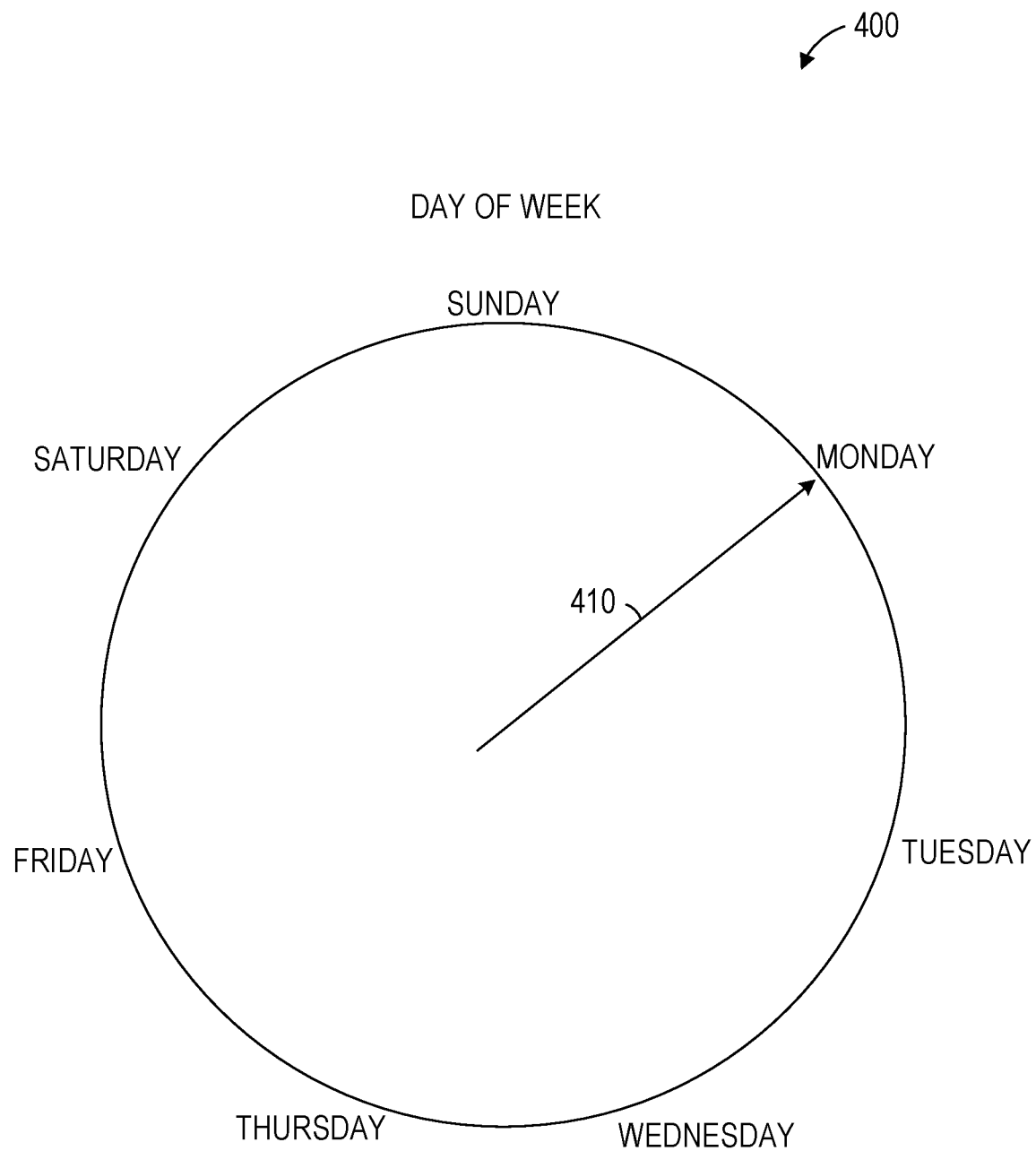
FIG. 4 is a conceptual diagram showing a day of the week as directional data on a 1-sphere.

FIG. 4 is a conceptual diagram showing a day of the week as directional data on a 1-sphere (a circle) 400. The days of the week are shown in a continuous loop, without a discontinuity between days at the beginning and end of the week. The vector 410 shows the day Monday. To simplify calculations, the circle 400 may be a unit circle and the vector 410 may be a unit vector. As in FIG. 3, the arc distance between two vectors may be measured as the smaller angle between them, regardless of where on the circle 400 the two vectors are located. Thus, the arc distance between Saturday and Monday is 2π/7 radians even though the beginning of the week lies between them. If the directional data were treated as linear data with a range of Sunday to Saturday, the distance between Monday and Saturday would be measured as five days apart.

FIG. 5 is a block diagram of an example database schema 500, suitable for storing directional data and privacy measures for use in providing privacy for directional data. The database schema 500 includes a location table 510, a sleep schedule table 540, and a privacy table 570. The location table 510 includes rows 530A, 530B, and 530C of a format 520. The sleep schedule table 540 includes rows 560A, 560B, and 560C of a format 550. The privacy table 570 includes rows 590A, 590B, and 590C of a format 580.

Each row of the location table 510 stores a location on the globe for a user at a date and time. The user identifier (ID) field stores a unique identifier for the user. For improved privacy protection, the user ID field may be replaced with a unique record ID, changed for each client device 160 after a predetermined period of time (e.g., every 15 seconds or every 60 seconds), or removed entirely. The latitude and longitude fields store the location of the user at the date and time indicated in the date field. For client-side privacy protection mechanisms, the location data in each row may have been modified by the client before uploading the data to the database server 130. For server-side privacy protection mechanisms, the location data in each row may be accurate, but the data will be modified by the privacy module 220 before being provided by the privacy server 140 to another server or client.

The rows of the sleep schedule table 540 store sleep times and wake times for users. The user ID field stores a unique identifier for the user. The sleep time and wake time fields store the time at which the identified user goes to sleep and wakes up (e.g., as self-reported, as an average of measurements, or with additional date/day information that allows for multiple rows per user). For client-side privacy protection mechanisms, the time data in each row may have been modified by the client before uploading the data to the database server 130. For server-side privacy protection mechanisms, the time data in each row may be accurate, but the data will be modified by the privacy module 220 before being provided by the privacy server 140 to another server.

The privacy table 570 stores, for each directional data type, a corresponding epsilon value. Higher values for epsilon increase the privacy of the directional data but decrease the accuracy of the values reported by the privacy server 140.

Figure 6:
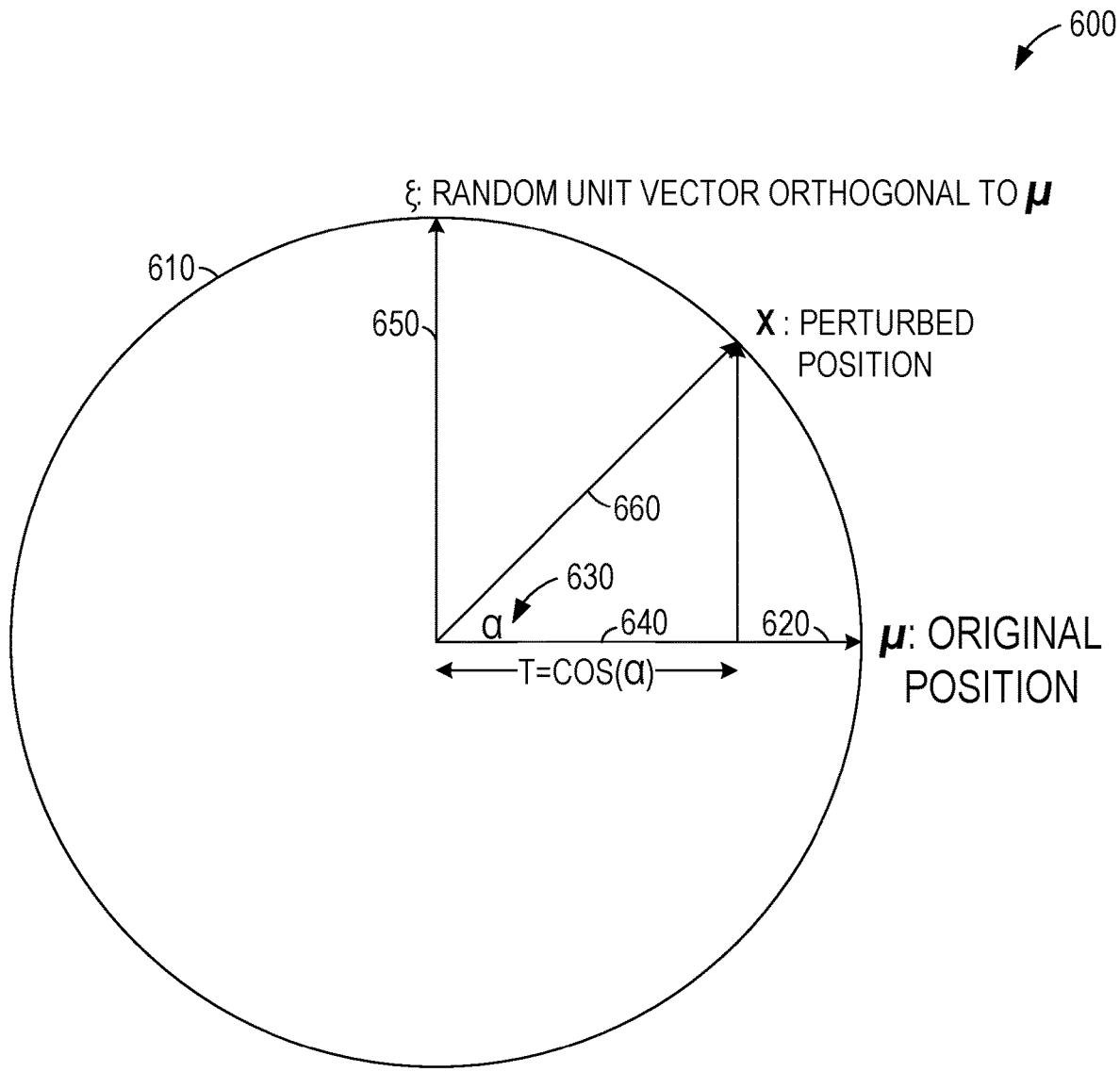
FIG. 6 is a diagram showing an example true directional data value and a modified directional data value that protects privacy.

FIG. 6 is a diagram 600 showing a true directional data value 620 and a perturbed (or modified) directional data value 650 that protects privacy. The true directional data value 620 is a unit vector μ 620 that identifies a point on the surface of a unit n-sphere 610. Based on the epsilon value in the privacy table 570 of FIG. 5, an angle α 630 is selected from an angular distribution and a length t 640 is determined as cos(α). Alternatively, the value t 640 may be sampled from the mixture distribution VMFMix(n, ε).

The unit vector ξ 650 is selected randomly from the set of unit vectors orthogonal to the unit vector μ 620. Considering the n-sphere 610 as a 2-dimensional circle, the vector ξ is selected from the two unit vectors orthogonal to μ. In the example of FIG. 6, in which μ is pointing to the right, ξ is either pointing straight up or straight down. Thus, ξ is selected from the values on a 1-dimensional line orthogonal to μ and passing through the origin of the n-sphere 610.

Considering the n-sphere 610 as a 3-dimensional sphere, the vector ξ is selected from the all unit vectors on the 2-dimensional plane orthogonal to μ and passing through the origin of the n-sphere 610. When the n-sphere 610 is a hypersphere of dimensionality greater than 3, the vector ξ is selected from the all unit vectors on the (n−1)-dimensional hyperplane orthogonal to μ and passing through the origin of the n-sphere 610.

A hyperplane is a subspace having a dimension one less than the space in which it is embedded. For example, an ordinary 2-dimensional plane exists in 3-dimensional space and may be referred to as a 2-dimensional hyperplane. As another example, a 1-dimensional line in a 2-dimensional space is a 1-dimensional hyperplane.

The modified directional data value x 660 is given by $$x = t\mu + \xi\sqrt{1-t^2}$$
$$= \xi\sin\alpha + \mu\cos\alpha$$

A unit vector x (as represented by the modified directional data value 650) is selected randomly from the vectors identifying the locus of points defined by the intersection of an (n−2)-dimensional hyperplane that is perpendicular to μ and intersects it at a distance t from the origin with the n-sphere 610.

Though the n-sphere 610 is described as a unit n-sphere, n-spheres with different radii may be used. However, in each case, the vector μ that identifies a point on the surface of the n-sphere 610 is a vector from the center of the n-sphere 610 to a point on the surface of the n-sphere 610, the vector having a magnitude equal to the radius of the n-sphere 610.

Figure 7:
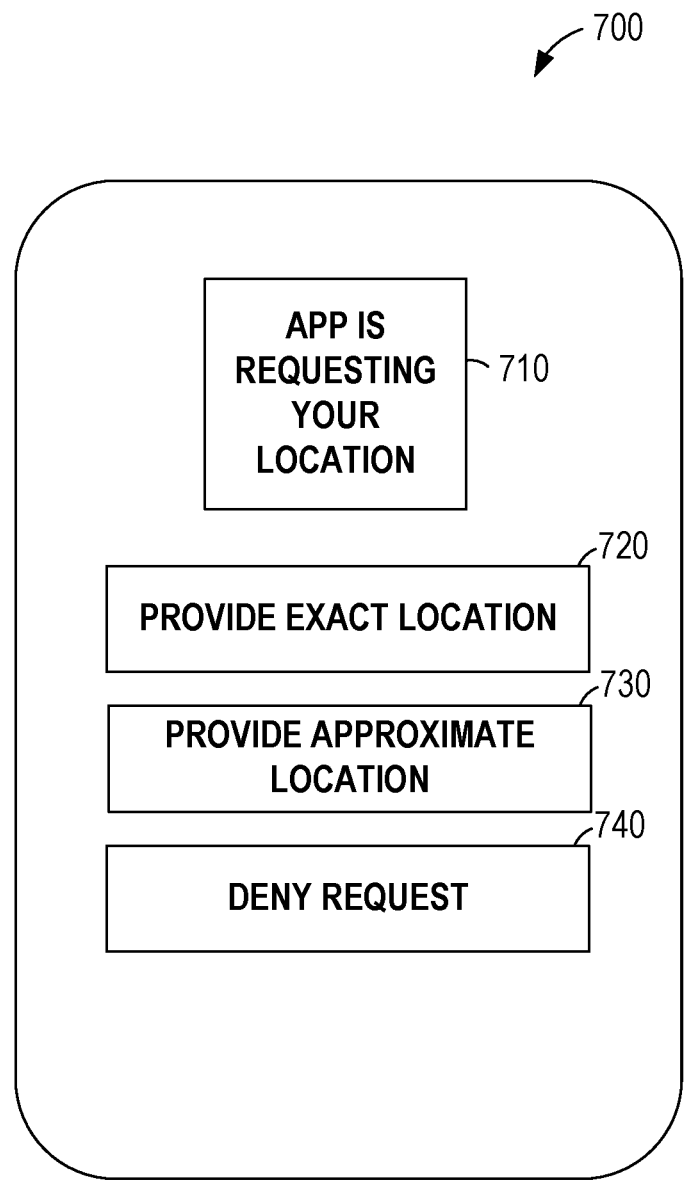
FIG. 7 is a block diagram of an example user interface that enables a user to provide true directional data or a modified directional data value that protects privacy.

FIG. 7 is a block diagram of an example user interface 700 that enables a user to provide true directional data or a modified directional data value that protects privacy. The user interface 700 includes an informational area 710 and interactive elements 720, 730, and 740.

The informational area 710 indicates that an application is requesting location data of the user (e.g., as provided by a GPS device, triangulation of cell tower signals, accumulated motion read by gyroscopic sensors from a known location, or any suitable combination thereof). The user is presented the option to provide the exact location, using interactive element 720, to provide an approximate location, using interactive element 730, or to deny the request, using interactive element 740.

If the user selects interactive element 720, the exact location of the user is provided to the application (e.g., to the network-based application 110 via the network 150). In this case, if the user's directional privacy is protected, it will be by the privacy server 140.

In response to a user selection of interactive element 730, only an approximate location of the user is provided to the application. For example, a location may be selected from a probability distribution on an n-sphere based on the true location of the user and a privacy parameter (e.g., the epsilon value in the privacy table 570 for the type of directional data being provided).

As a third option, the user may select interactive element 740, denying the application's request for location data completely. Though the user interface 700 regards location data, similar user interfaces may be used for other types of directional data. By use of the user interface 700, the user is enabled to have finer-grained control over their data than with a simple allow/deny interface. As a result, applications may be granted access to privacy-protected directional data instead of being denied entirely, improving the functionality of the applications. Additionally or alternatively, users may grant access to privacy-protected directional data instead of exact directional data, improving the privacy of users.

Figure 8:
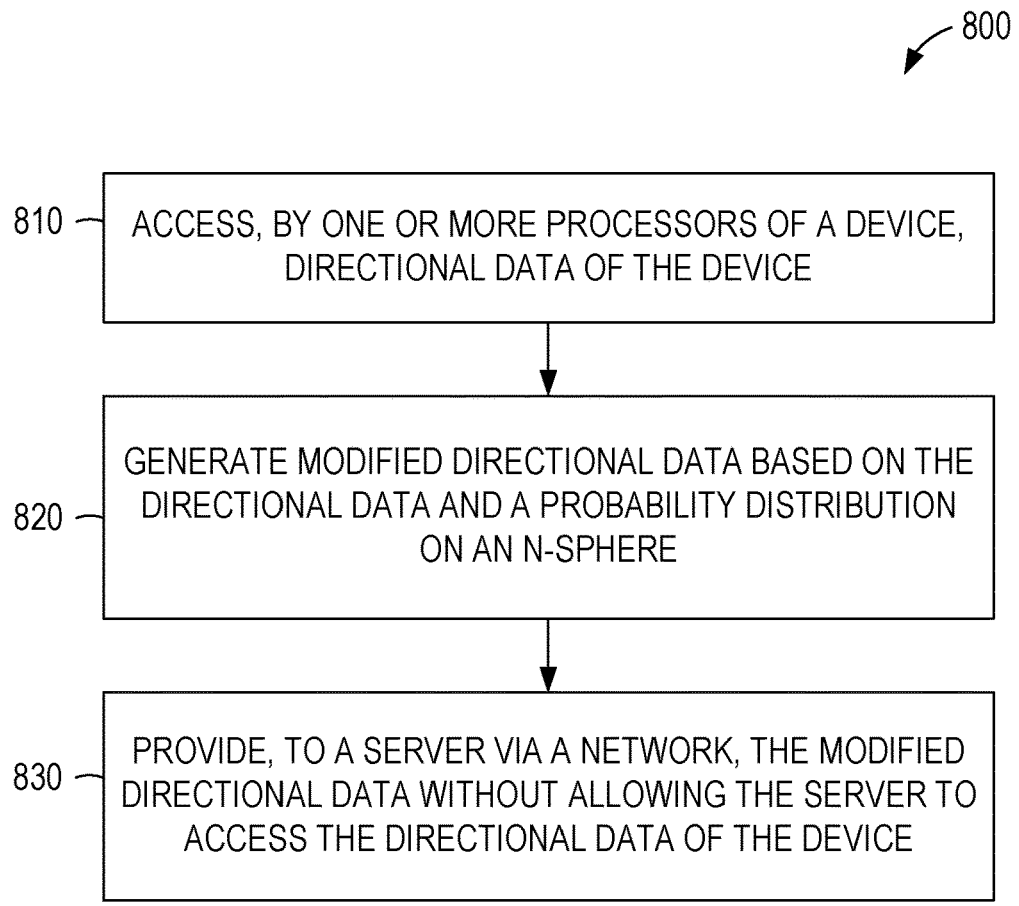
FIG. 8 is a flowchart illustrating operations of an example method suitable for protecting privacy of directional data.

FIG. 8 is a flowchart illustrating operations of an example method 800 suitable for protecting privacy of directional data. The method 800 includes operations 810, 820, and 830. By way of example and not limitation, the method 800 may be performed by the client device 160A of FIG. 1, in communication with the network-based application 110, using the modules, databases, structures, and user interfaces shown in FIGS. 2-7.

In operation 810, one or more processors of the client device 160A access directional data of the device. For example, location data of the device that indicates the current location of the device, as reported by a GPS receiver, may be accessed.

The client device 160A, in operation 820, generates modified directional data based on the directional data and a probability distribution on an n-sphere. For example, a probability on the 2-sphere $S^2$ (a 3-dimensional sphere) based on a predetermined privacy parameter may be used to select from a set of locations centered on the current location of the device. The selected location is the modified directional data.

In operation 830, the client device 160A provides, to a server via a network (e.g., to the application server 120 via the network 150), the modified directional data without allowing the server to access the directional data of the device. Thus, the application server 120 is enabled to use the user's location data for aggregate metrics such as tracking traffic flow, but is not able to pinpoint the user's precise location, providing a measure of directional privacy to the user.

By way of example and not limitation, the operations 810-830 of the example method 800 are described above as operating on location data (e.g., GPS data) of a 3-dimensional sphere. Alternatively or additionally, the operations 810-830 may operate on time of day data of a 2-dimensional circle, day of week data of a 2-dimensional circle, or location/orientation data of a 6-dimensional hypersphere.

Figure 9:
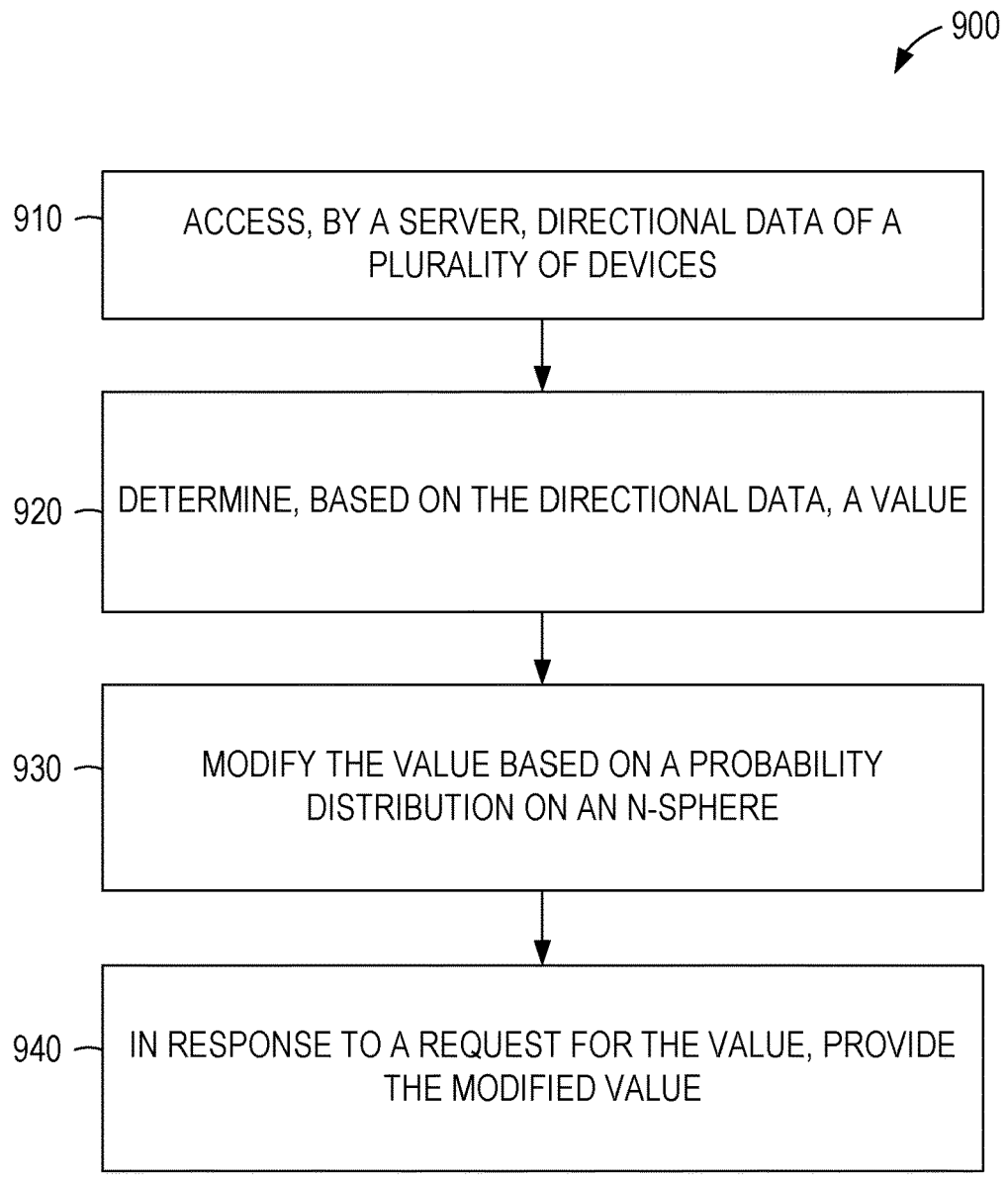
FIG. 9 is a flowchart illustrating operations of an example method suitable for protecting privacy of directional data.

FIG. 9 is a flowchart illustrating operations of an example method 900 suitable for protecting privacy of directional data. The method 900 includes operations 910, 920, 930, and 940. By way of example and not limitation, the method 900 may be performed by the privacy server 140 of FIG. 1, using the modules, databases, structures, and user interfaces shown in FIGS. 2-7.

In operation 910, a server (e.g., the privacy server 140) accesses directional data of a plurality of devices. For example, multiple client devices 160 may have their directional data stored in the database server 130, using the database schema 500. The privacy server 140 may execute a database query to select a set of the directional data (e.g., to select all location data for an identified period of time).

The server, in operation 920, determines a value based on the directional data. For example, the directional data may be used to determine a mean, a median, a standard deviation, a variance, or any suitable combination thereof.

In operation 930, the server modifies the determined value based on a probability distribution on an n-sphere. For example, the probability distribution may identify a set of points with corresponding probabilities, centered on the determined value. A point is selected from the set of points, according to their respective probabilities, and the vector pointing from the center of the n-sphere to the selected point is used as the modified value.

In response to a request for the value determined based on the directional data, the server instead provides the modified value (operation 940). Thus, the provided directional data value is based on the actual directional data, but is not identical to the actual directional data, protecting the privacy of the individual contributors of the directional data. For example, a request for average location may be made after each individual piece of location data is provided to the application server 120. The provided average location, in each request, will be close to the actual average location, as determined by the probability distribution. However, reverse-engineering of the exact location of each contributing user will not be possible, providing differential privacy to the users.

By contrast, if an exact average value is taken from a database and the exact number of values contributing to that average is known, the value of a single additional record can be determined from an updated exact average value. For example, if the mean of a value is known to be 5 and the number of records is known to be 2 and, after adding a single record, the mean is now 6, hiding the value of the third record behind a statistical aggregation has not protected the value of the third record. The sum of the original two values was known to be 10 (such that the mean was 5) and the sum of the three values is known to be 18 (such that the mean is 6). Accordingly, the third value is 8. Thus, even when data is only provided in aggregated statistical form, differential privacy is not provided without adding some form of differential privacy protection.

In view of the above described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a method comprising: accessing, by one or more processors of a device, directional data of the device; generating, by the one or more processors, modified directional data based on the directional data and a probability distribution on an n-sphere; and providing, to a server via a network, the modified directional data without allowing the server to access the directional data of the device.

In Example 2, the subject matter of Example 1 includes, wherein: the directional data is time of day data; and the n-sphere is a 2-dimensional circle.

In Example 3, the subject matter of Examples 1-2 includes, wherein: the directional data is day of week data; and the n-sphere is a 2-dimensional circle.

In Example 4, the subject matter of Examples 1-3 includes, wherein: the directional data is global positioning data; and the n-sphere is a 3-dimensional sphere.

In Example 5, the subject matter of Examples 1–4 includes, wherein the probability distribution is based on a predetermined privacy parameter.

In Example 6, the subject matter of Examples 1-5 includes, wherein: the n-sphere has a center, a radius, and a surface; the directional data of the device is expressed as a vector from the center of the n-sphere to a first point on the n-sphere, the vector having a magnitude equal to the radius of the n-sphere; and the generating of the modified directional data comprises: selecting the modified directional data from a set of vectors from the center of the n-sphere to points on the surface of the n-sphere and on an (n−1)-dimensional hyperplane that is orthogonal to the vector and intersects the vector at a second point within the n-sphere.

In Example 7, the subject matter of Example 6 includes, wherein: the modified directional data is selected based on a sampled value from a mixture distribution.

Example 8 is a device comprising: a memory that stores instructions; and one or more processors configured by the instructions to perform operations comprising: accessing directional data of the device; generating modified directional data based on the directional data and a probability distribution on an n-sphere; and providing, to a server via a network, the modified directional data without allowing the server to access the directional data of the device.

In Example 9, the subject matter of Example 8 includes, wherein: the directional data is time of day data; and the n-sphere is a 2-dimensional circle.

In Example 10, the subject matter of Examples 8-9 includes, wherein: the directional data is day of week data; and the n-sphere is a 2-dimensional circle.

In Example 11, the subject matter of Examples 8-10 includes, wherein: the directional data is global positioning data; and the n-sphere is a 3-dimensional sphere.

In Example 12, the subject matter of Examples 8-11 includes, wherein the probability distribution is based on a predetermined privacy parameter.

In Example 13, the subject matter of Examples 8-12 includes, wherein: the n-sphere has a center, a radius, and a surface; the directional data of the device is expressed as a vector from the center of the n-sphere to a first point on the n-sphere, the vector having a magnitude equal to the radius of the n-sphere; and the generating of the modified directional data comprises: selecting the modified directional data from a set of vectors from the center of the n-sphere to points on the surface of the n-sphere and on an (n−1)-dimensional hyperplane that is orthogonal to the vector and intersects the vector at a second point within the n-sphere.

In Example 14, the subject matter of Example 13 includes, wherein: the modified directional data is selected based on a sampled value from a mixture distribution.

Example 15 is a non-transitory computer-readable medium that stores instructions that, when executed by one or more processors of a device, cause the one or more processors to perform operations comprising: accessing directional data of the device; generating modified directional data based on the directional data and a probability distribution on an n-sphere; and providing, to a server via a network, the modified directional data without allowing the server to access the directional data of the device.

In Example 16, the subject matter of Example 15 includes, wherein: the directional data is time of day data; and the n-sphere is a 2-dimensional circle.

In Example 17, the subject matter of Examples 15-16 includes, wherein: the directional data is day of week data; and the n-sphere is a 2-dimensional circle.

In Example 18, the subject matter of Examples 15-17 includes, wherein: the directional data is global positioning data; and the n-sphere is a 3-dimensional sphere.

In Example 19, the subject matter of Examples 15-18 includes, wherein the probability distribution is based on a predetermined privacy parameter.

In Example 20, the subject matter of Examples 15-19 includes, wherein: the n-sphere has a center, a radius, and a surface; the directional data of the device is expressed as a vector from the center of the n-sphere to a first point on the n-sphere, the vector having a magnitude equal to the radius of the n-sphere; and the generating of the modified directional data comprises: selecting the modified directional data from a set of vectors from the center of the n-sphere to points on the surface of the n-sphere and on an (n−1)-dimensional hyperplane that is orthogonal to the vector and intersects the vector at a second point within the n-sphere.

Example 21 is at least one machine-readable medium including instructions that, when executed by processing circuitry, cause the processing circuitry to perform operations to implement of any of Examples 1-20.

Example 22 is an apparatus comprising means to implement any of Examples 1-20.

Example 23 is a system to implement any of Examples 1-20.

Example 24 is a method to implement any of Examples 1-20.

Figure 10:
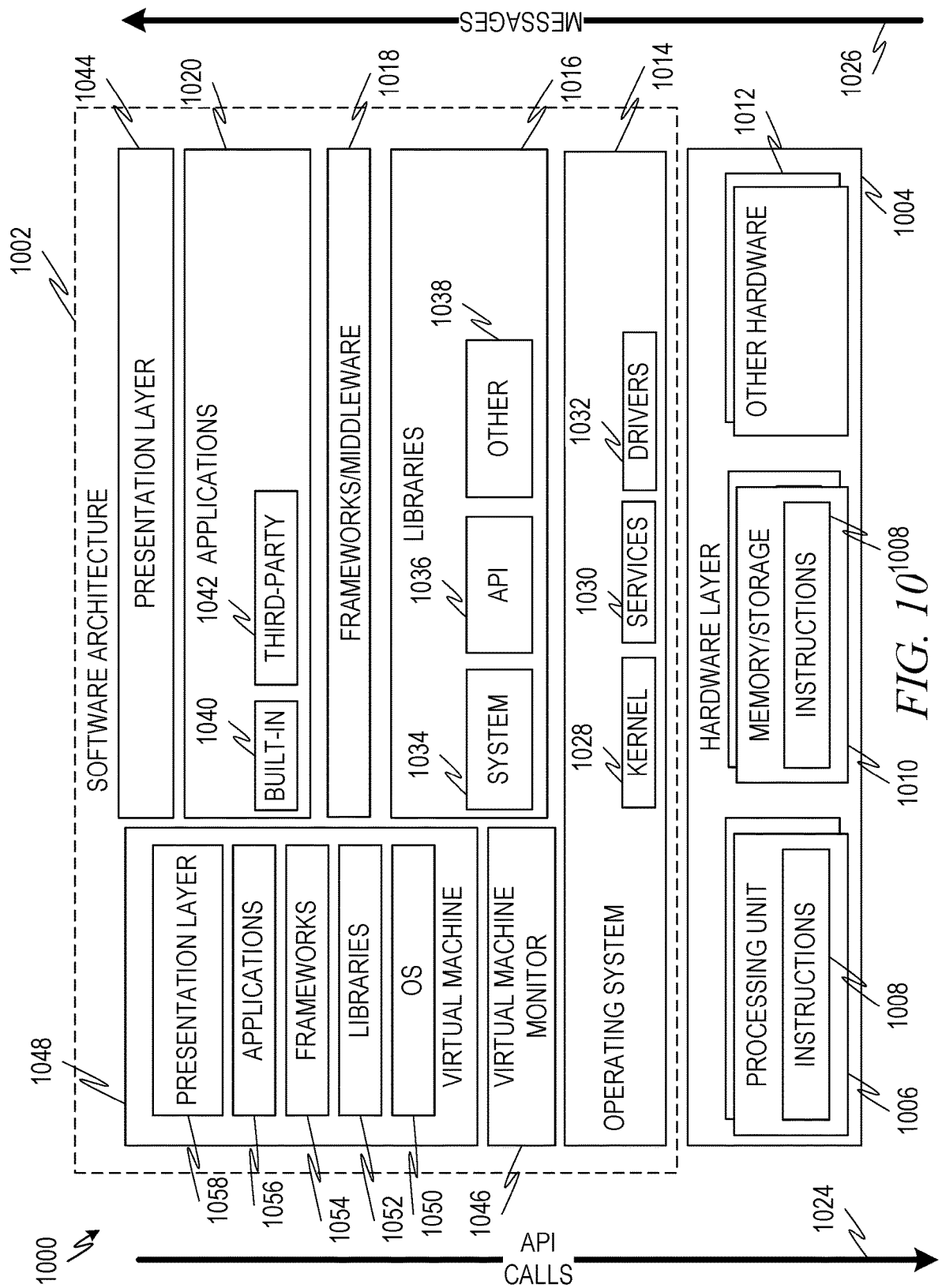
FIG. 10 is a block diagram showing one example of a software architecture for a computing device.

FIG. 10 is a block diagram 1000 showing one example of a software architecture 1002 for a computing device. The architecture 1002 may be used in conjunction with various hardware architectures, for example, as described herein. FIG. 10 is merely a non-limiting example of a software architecture and many other architectures may be implemented to facilitate the functionality described herein. A representative hardware layer 1004 is illustrated and can represent, for example, any of the above referenced computing devices. In some examples, the hardware layer 1004 may be implemented according to the architecture of the computer system of FIG. 10.

The representative hardware layer 1004 comprises one or more processing units 1006 having associated executable instructions 1008. Executable instructions 1008 represent the executable instructions of the software architecture 1002, including implementation of the methods, modules, subsystems, and components, and so forth described herein and may also include memory and/or storage modules 1010, which also have executable instructions 1008. Hardware layer 1004 may also comprise other hardware as indicated by other hardware 1012 which represents any other hardware of the hardware layer 1004, such as the other hardware illustrated as part of the software architecture 1002.

In the example architecture of FIG. 10, the software architecture 1002 may be conceptualized as a stack of layers where each layer provides particular functionality. For example, the software architecture 1002 may include layers such as an operating system 1014, libraries 1016, frameworks/middleware 1018, applications 1020, and presentation layer 1044. Operationally, the applications 1020 and/or other components within the layers may invoke application programming interface (API) calls 1024 through the software stack and access a response, returned values, and so forth illustrated as messages 1026 in response to the API calls 1024. The layers illustrated are representative in nature and not all software architectures have all layers. For example, some mobile or special purpose operating systems may not provide a frameworks/middleware 1018 layer, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. In some examples, the services 1030 include an interrupt service. The interrupt service may detect the receipt of an interrupt and, in response, cause the architecture 1002 to pause its current processing and execute an interrupt service routine (ISR) when an interrupt is accessed.

The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1016 may provide a common infrastructure that may be utilized by the applications 1020 and/or other components and/or layers. The libraries 1016 typically provide functionality that allows other software modules to perform tasks in an easier fashion than to interface directly with the underlying operating system 1014 functionality (e.g., kernel 1028, services 1030 and/or drivers 1032). The libraries 1016 may include system libraries 1034 (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks/middleware 1018 may provide a higher-level common infrastructure that may be utilized by the applications 1020 and/or other software components/modules. For example, the frameworks/middleware 1018 may provide various graphic user interface (GUI) functions, high-level resource management, high-level location services, and so forth. The frameworks/middleware 1018 may provide a broad spectrum of other APIs that may be utilized by the applications 1020 and/or other software components/modules, some of which may be specific to a particular operating system or platform.

The applications 1020 include built-in applications 1040 and/or third-party applications 1042. Examples of representative built-in applications 1040 may include, but are not limited to, a contacts application, a browser application, a book reader application, a location application, a media application, a messaging application, and/or a game application. Third-party applications 1042 may include any of the built-in applications as well as a broad assortment of other applications. In a specific example, the third-party application 1042 (e.g., an application developed using the Android™ or iOS™ software development kit (SDK) by an entity other than the vendor of the particular platform) may be mobile software running on a mobile operating system such as iOS™ Android™, Windows® Phone, or other mobile computing device operating systems. In this example, the third-party application 1042 may invoke the API calls 1024 provided by the mobile operating system such as operating system 1014 to facilitate functionality described herein.

The applications 1020 may utilize built in operating system functions (e.g., kernel 1028, services 1030 and/or drivers 1032), libraries (e.g., system libraries 1034, API libraries 1036, and other libraries 1038), frameworks/middleware 1018 to create user interfaces to interact with users of the system. Alternatively, or additionally, in some systems, interactions with a user may occur through a presentation layer, such as presentation layer 1044. In these systems, the application/module "logic" can be separated from the aspects of the application/module that interact with a user.

Some software architectures utilize virtual machines. In the example of FIG. 10, this is illustrated by virtual machine 1048. A virtual machine creates a software environment where applications/modules can execute as if they were executing on a hardware computing device. A virtual machine is hosted by a host operating system (operating system 1014) and typically, although not always, has a virtual machine monitor 1046, which manages the operation of the virtual machine 1048 as well as the interface with the host operating system (i.e., operating system 1014). A software architecture executes within the virtual machine 1048 such as an operating system 1050, libraries 1052, frameworks/middleware 1054, applications 1056 and/or presentation layer 1058. These layers of software architecture executing within the virtual machine 1048 can be the same as corresponding layers previously described or may be different.

Modules, Components and Logic

A computer system may include logic, components, modules, mechanisms, or any suitable combination thereof. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. One or more computer systems (e.g., a standalone, client, or server computer system) or one or more hardware processors may be configured by software (e.g., an application or application portion) as a hardware-implemented module that operates to perform certain operations as described herein.

A hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Hardware-implemented modules may be temporarily configured (e.g., programmed), and each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). Multiple hardware-implemented modules are configured or instantiated at different times. Communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. The processor or processors may be located in a single location (e.g., within a home environment, an office environment, or a server farm), or the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

The systems and methods described herein may be implemented using digital electronic circuitry, computer hardware, firmware, software, a computer program product (e.g., a computer program tangibly embodied in an information carrier, e.g., in a machine-readable medium for execution by, or to control the operation of, data processing apparatus, e.g., a programmable processor, a computer, or multiple computers), or any suitable combination thereof.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites (e.g., cloud computing) and interconnected by a communication network. In cloud computing, the server-side functionality may be distributed across multiple computers connected by a network. Load balancers are used to distribute work between the multiple computers. Thus, a cloud computing environment performing a method is a system comprising the multiple processors of the multiple computers tasked with performing the operations of the method.

Operations may be performed by one or more programmable processors executing a computer program to perform functions by operating on input data and generating output. Method operations can also be performed by, and apparatus of systems may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. A programmable computing system may be deployed using hardware architecture, software architecture, or both. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out example hardware (e.g., machine) and software architectures that may be deployed.

Example Machine Architecture and Machine-Readable Medium

Figure 11:
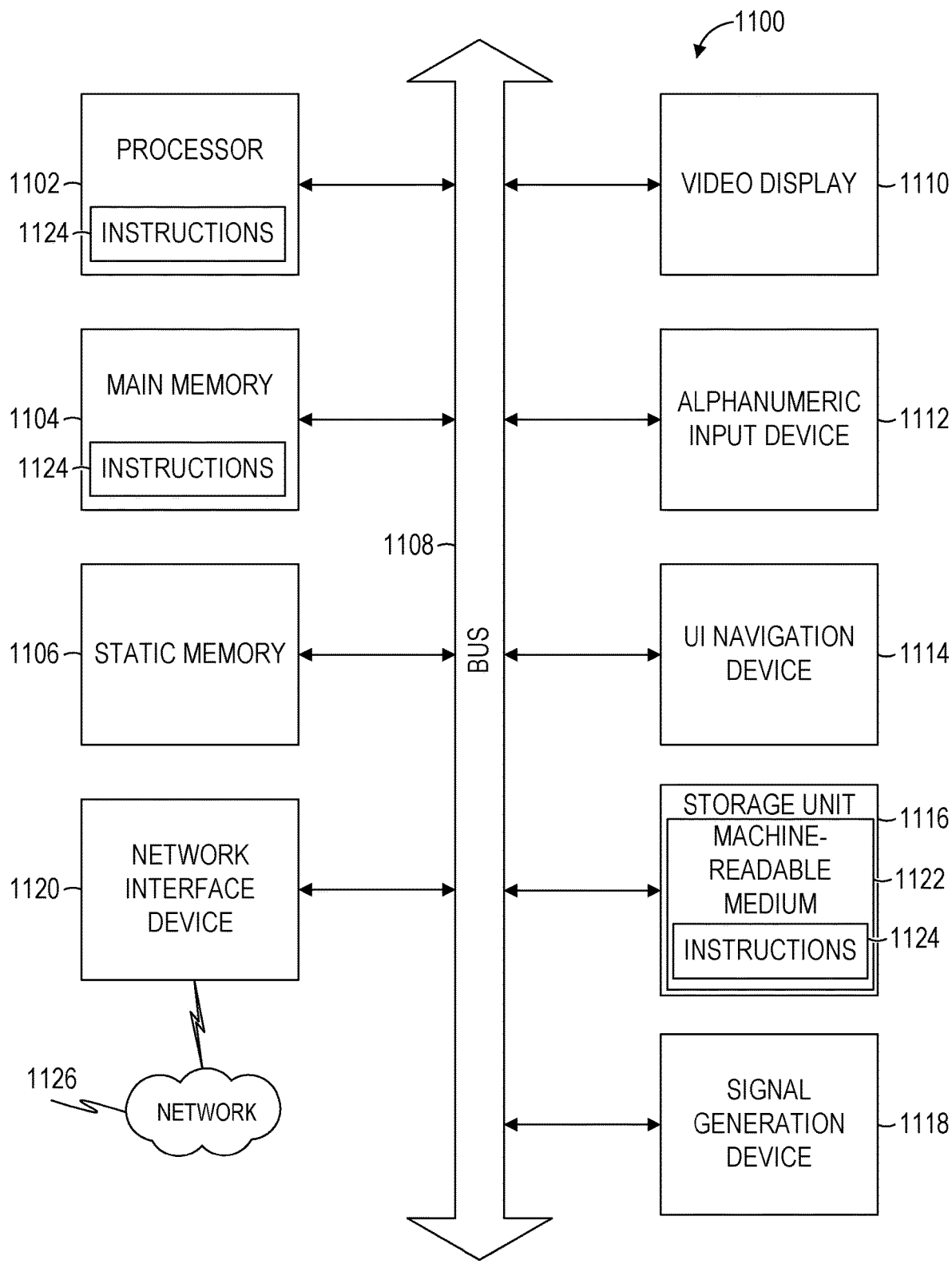
FIG. 11 is a block diagram of a machine in the example form of a computer system within which instructions may be executed for causing the machine to perform any one or more of the methodologies discussed herein.

FIG. 11 is a block diagram of a machine in the example form of a computer system 1100 within which instructions 1124 may be executed for causing the machine to perform any one or more of the methodologies discussed herein. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104, and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard or a touch-sensitive display screen), a user interface (UI) navigation (or cursor control) device 1114 (e.g., a mouse), a storage unit 1116, a signal generation device 1118 (e.g., a speaker), and a network interface device 1120.

Machine-Readable Medium

The storage unit 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 and/or within the processor 1102 during execution thereof by the computer system 1100, with the main memory 1104 and the processor 1102 also constituting machine-readable media 1122.

While the machine-readable medium 1122 is shown in FIG. 11 to be a single medium, the term "machine-readable medium" may include a single medium or multiple media (e.g., a centralized or distributed database, and/or associated caches and servers) that store the one or more instructions 1124 or data structures. The term "machine-readable medium" shall also be taken to include any tangible medium that is capable of storing, encoding, or carrying instructions 1124 for execution by the machine and that cause the machine to perform any one or more of the methodologies of the present disclosure, or that is capable of storing, encoding, or carrying data structures utilized by or associated with such instructions 1124. The term "machine-readable medium" shall accordingly be taken to include, but not be limited to, solid-state memories, and optical and magnetic media. Specific examples of machine-readable media 1122 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 1124 may further be transmitted or received over a communications network 1126 using a transmission medium. The instructions 1124 may be transmitted using the network interface device 1120 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1124 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A method comprising:

accessing, by one or more processors of a device, directional data of the device that is expressed as a vector from a center of an n-sphere to a first point on a surface of the n-sphere, the vector having a magnitude equal to a radius of the n-sphere;

generating, by the one or more processors, modified directional data based on the directional data and a probability distribution on the n-sphere, the probability distribution being based on a predetermined privacy parameter, the generating of the modified directional data comprising:

selecting, based on a sampled value from a mixture distribution, the modified directional data from a set of vectors from the center of the n-sphere to points on the surface of the n-sphere and on an (n−1)-dimensional hyperplane that is orthogonal to the vector and intersects the vector at a second point within the n-sphere; and providing, by the one or more processors to a server via a network, the modified directional data without allowing the server to access the directional data of the device.

2. The method of claim 1, wherein:
the directional data is time of day data; and
the n-sphere is a 2-dimensional circle.

3. The method of claim 1, wherein:
the directional data is day of week data; and
the n-sphere is a 2-dimensional circle.

4. The method of claim 1, wherein:
the directional data is global positioning data; and
the n-sphere is a 3-dimensional sphere.

5. A device comprising:
a memory that stores instructions; and
one or more processors configured by the instructions to perform operations comprising:

accessing directional data of the device that is expressed as a vector from a center of an n-sphere to a first point on a surface of the n-sphere, the vector having a magnitude equal to a radius of the n-sphere;

generating modified directional data based on the directional data and a probability distribution on the n-sphere, the probability distribution being based on a predetermined privacy parameter, the generating of the modified directional data comprising:

selecting, based on a sampled value from a mixture distribution, the modified directional data from a set of vectors from the center of the n-sphere to points on the surface of the n-sphere and on an (n−1)-dimensional hyperplane that is orthogonal to the vector and intersects the vector at a second point within the n-sphere; and providing, to a server via a network, the modified directional data without allowing the server to access the directional data of the device.

6. The device of claim 5, wherein:
the directional data is time of day data; and
the n-sphere is a 2-dimensional circle.

7. The device of claim 5, wherein:
the directional data is day of week data; and
the n-sphere is a 2-dimensional circle.

8. The device of claim 5, wherein:
the directional data is global positioning data; and
the n-sphere is a 3-dimensional sphere.

9. A non-transitory computer-readable medium that stores instructions that, when executed by one or more processors of a device, cause the one or more processors to perform operations comprising:

accessing directional data of the device that is expressed as a vector from a center of an n-sphere to a first point on a surface of the n-sphere, the vector having a magnitude equal to a radius of the n-sphere;

generating modified directional data based on the directional data and a probability distribution on the n-sphere, the probability distribution being based on a predetermined privacy parameter, the generating of the modified directional data comprising:

selecting, based on a sampled value from a mixture distribution, the modified directional data from a set of vectors from the center of the n-sphere to points on the surface of the n-sphere and on an (n−1)-dimensional hyperplane that is orthogonal to the vector and intersects the vector at a second point within the n-sphere; and providing, to a server via a network, the modified directional data without allowing the server to access the directional data of the device.

10. The computer-readable medium of claim 9, wherein:
the directional data is time of day data; and
the n-sphere is a 2-dimensional circle.

11. The computer-readable medium of claim 9, wherein:
the directional data is day of week data; and
the n-sphere is a 2-dimensional circle.

12. The computer-readable medium of claim 9, wherein:
the directional data is global positioning data; and
the n-sphere is a 3-dimensional sphere.

13. The method of claim 1, wherein the mixture distribution is a rotationally symmetric distribution.

14. The method of claim 1, wherein the mixture distribution has a constant probability density function.

15. The method of claim 1, wherein:
the directional data comprises location and orientation data; and
the n-sphere comprises more than three dimensions.

16. The device of claim 5, wherein the mixture distribution is a rotationally symmetric distribution.

17. The device of claim 5, wherein the mixture distribution has a constant probability density function.

18. The device of claim 5, wherein:
the directional data comprises location and orientation data; and
the n-sphere comprises more than three dimensions.

19. The computer-readable medium of claim 9, wherein the mixture distribution is a rotationally symmetric distribution.

20. The computer-readable medium of claim 9, wherein the mixture distribution has a constant probability density function.

* * * * *